US011806299B2

(12) United States Patent
Chen et al.

(10) Patent No.: US 11,806,299 B2
(45) Date of Patent: Nov. 7, 2023

(54) PASSIVE ENERGY-STORAGE EXOSKELETON FOR ASSISTING ELBOW JOINT

(71) Applicant: Green Industry Innovation Research Institute, Anhui University, Anhui (CN)

(72) Inventors: Wenjie Chen, Hefei (CN); Xiantao Sun, Hefei (CN); Libo Zhou, Hefei (CN); Weihai Chen, Hefei (CN); Jun Tao, Hefei (CN); Cungang Hu, Hefei (CN)

(73) Assignee: Green Industry Innovation Research Institute, Anhui University

( * ) Notice: Subject to any disclaimer, the term of this patent is extended or adjusted under 35 U.S.C. 154(b) by 437 days.

(21) Appl. No.: 17/183,507

(22) Filed: Feb. 24, 2021

(65) Prior Publication Data
US 2022/0133577 A1    May 5, 2022

(30) Foreign Application Priority Data

Nov. 5, 2020 (CN) .......................... 202011224245.4

(51) Int. Cl.
*A61H 1/02* (2006.01)
*H02J 15/00* (2006.01)
(Continued)

(52) U.S. Cl.
CPC .............. *A61H 1/0277* (2013.01); *F03G 5/06* (2013.01); *H02J 15/007* (2020.01);
(Continued)

(58) Field of Classification Search
CPC .............. A61H 1/0277; A61H 2201/14; A61H 2201/1635; A61H 1/02; A61H 1/0274;
(Continued)

(56) References Cited

U.S. PATENT DOCUMENTS

| 2018/0133905 A1* | 5/2018 | Smith | ................... F16D 25/048 |
| 2018/0193172 A1* | 7/2018 | Smith | ..................... B25J 9/148 |
| 2019/0070058 A1* | 3/2019 | Kurzweg | ................. A61F 5/03 |

FOREIGN PATENT DOCUMENTS

CN        107307974 A  * 11/2017  .......... A61H 1/0277

OTHER PUBLICATIONS

English translation for CN 107307974 (Year: 2017).*

* cited by examiner

*Primary Examiner* — Quang D Thanh
(74) *Attorney, Agent, or Firm* — Lerner David LLP

(57) ABSTRACT

A passive energy-storage exoskeleton for assisting elbow joint is provided, which includes an upper arm unit, a lower arm unit, and an elbow joint unit located therebetween, the upper arm unit is rotatably connected with the lower arm unit. The elbow joint unit includes an anti-gravity mechanism, a coil spring mechanism, and a lower-arm-unit self-locking mechanism. The anti-gravity mechanism generates an equilibrant moment to eliminate the influence of the weight of the arm of the user and the weight of the device on the elbow joint. The lower-arm-unit self-locking mechanism is configured for locking/releasing the lower arm unit at any specified angle of rotation. The coil spring mechanism is configured for capturing and storing kinetic energy generated by rotation and swing of the arm of the user and releasing the energy as required.

10 Claims, 6 Drawing Sheets

(51) Int. Cl.
*F03G 5/06* (2006.01)
*F16H 37/12* (2006.01)

(52) U.S. Cl.
CPC .. *A61H 2201/14* (2013.01); *A61H 2201/1635* (2013.01); *F16H 37/122* (2013.01)

(58) Field of Classification Search
CPC .... A61H 2201/0157; A61H 2201/1253; A61H 2201/1261; A61H 2201/1269; A61H 2201/1673; A61H 2205/06; F03G 5/06; H02J 15/007; F16H 37/122; B25J 9/0006; Y02E 60/16
See application file for complete search history.

PASSIVE ENERGY-STORAGE EXOSKELETON FOR ASSISTING ELBOW JOINT

CROSS REFERENCE TO RELATED APPLICATION

This application claims the priority of Chinese Patent Application No. 202011224245.4, filed on Nov. 5, 2020, the disclosure of which is incorporated herein by reference.

FIELD OF THE INVENTION

The present disclosure belongs to the field of article processing systems, and in particular, to the field of exoskeletons wearable on the elbow joint to assist the elbow joint in lifting or carrying a load. Particularly, the present disclosure relates to a passive energy-storage exoskeleton for assisting elbow joint.

BACKGROUND OF THE INVENTION

Lifting/carrying weights with hands may lead to muscle fatigue or damage. According to statistics, muscle damage account for about 30% of all damage and diseases occurring in the workplace. Generally, methods to prevent the damage include teaching workers the correct lifting techniques, requiring that a lifting task should be shared by several workers, and using mechanical lifting devices to assist as much as possible. However, most mechanical lifting devices work slower than human hands, and they are not readily available and are also often restricted by the environment, so that when a load is considered to be within the lifting capacity of human beings, people tend to handle it directly by hand.

Wearable exoskeletons can be used to reduce the load on the muscles and bones. They can be divided into "active" or "passive" depending on usage of energy. An active exoskeleton system includes one or more actuators to help increase the strength of specific joints in the human body. However, these actuators are often limited by power source, safety issues, and/or weight. A passive exoskeleton does not need any additional energy, and only uses elastic elements, such as springs, rubber bands or other, to provide restoring moments or additional vertical lifting forces. These moments or lifting forces may eliminate all or part of the load on the muscles when the muscles are supporting an object such as a tool or material. Since the passive exoskeleton does not need any external power supply or motor, the problems existing in the active exoskeleton are avoided.

However, the existing passive exoskeletons still have the following problems:

1) At present, passive exoskeletons are generally used in prostheses. These devices can well equilibrate invariable weights, for example, arms and/or legs. However, if the load varies, such passive prostheses need to be adjusted off-line. Therefore, it is difficult to use them to handle materials of different weights.

2) The existing passive exoskeletons are unable to collect kinetic energy of motions of human body parts. Therefore, these devices cannot utilize the energy of the human body to increase the lifting force of the user.

3) The existing passive exoskeletons cannot mechanically lock the arm joint and unlock the arm joint when needed.

4) In the structure of the existing passive exoskeleton, elastic elements are mounted externally. Generally speaking, such structures are not compact and unsafe.

SUMMARY OF THE INVENTION

An object of the disclosure is to provide a passive energy-storage exoskeleton for assisting elbow joint, with which the lifting capability of the elbow of the human body is increased by utilizing the own power of the human body and the mechanical advantage of the mechanism, so that the problem that the existing passive exoskeleton is unable to collect kinetic energy of human body parts is solved, and muscle fatigue and damage of the user in carrying/lifting materials is prevented.

In order to achieve the object of the disclosure, the following technical scheme is adopted: a passive energy-storage exoskeleton for assisting elbow joint includes an upper arm unit, a lower arm unit, and an elbow joint unit located therebetween, the upper arm unit being rotatably connected with the lower arm unit.

The elbow joint unit includes an anti-gravity mechanism, a coil spring mechanism, and a lower-arm-unit self-locking mechanism.

The anti-gravity mechanism includes a cardan's gear mechanism and an elastic part. The cardan's gear mechanism includes a big ring gear fixed to the lower arm unit and a pinion hinged to the upper arm unit, and the pinion is meshed with the big ring gear; a first end of the elastic part is hinged to a position deviated from a center of the pinion, and a second end of the elastic part is connected to a lower end of the lower arm unit.

The coil spring mechanism includes an energy-storage ratchet wheel, a spindle, a coil spring, a pawl B, and a pawl C. The energy-storage ratchet wheel is fixed to the lower arm unit, and the spindle is fixed to the upper arm unit. The coil spring is fixed to the spindle at an inner end of the coil spring, and is fixed to the energy-storage ratchet wheel at an outer end thereof. The pawl B is hinged to the upper arm unit, the pawl C is hinged to the lower arm unit, and the pawl B and the pawl C are provided with a switch B and a switch C respectively for adjusting respective engagements of the pawl B and the pawl C with the energy-storage ratchet wheel.

The lower-arm-unit self-locking mechanism includes a self-locking ratchet wheel and a pawl A, the self-locking ratchet wheel is fixed to the lower arm unit, the pawl A is hinged to the upper arm unit. The self-locking ratchet wheel includes a ratchet teeth portion and a protruding edge portion which are alternately arranged at an outer edge of the self-locking ratchet wheel, and the pawl A is provided with a switch A for adjusting engagement between the pawl A and the ratchet teeth portion.

The elbow joint unit has three functions: 1) locking/releasing the lower arm unit at any specified angle of rotation; 2) generating an equilibrant moment to eliminate the influence of the weight of the arm of the user and the weight of the device on the elbow joint; and 3) capturing and storing kinetic energy generated by rotation and swing of the arm of the user and releasing the energy when needed.

The anti-gravity mechanism is configured for compensating the moment of the weight of the forearm of the human body and the weight of the lower arm unit of the device on the elbow joint. The coil spring mechanism is configured for storing/releasing kinetic energy generated by swing of the arm of the user. The lower arm unit self-locking mechanism is configured for locking the lower arm unit at any specified swung position.

In some embodiments, the anti-gravity mechanism is arranged within the lower arm unit.

In some embodiments, the switch A, the switch B and the switch C may be manually controlled or electrically controlled.

In some embodiments, at least one of the switch A, the switch B and the switch C may be bistable switch, and each of the switch A, the switch B and the switch C may include a slidable control button, two sliding blocks arranged on two sides of the control button and sliding opposite to each other, and two connecting rods hinged between the control button and the two sliding blocks; the two sliding blocks may slide in a direction perpendicular to that of the control button; an end of one of the two sliding blocks and an end of another sliding block facing away from the end of the one may be each connected with a spring at first end of the spring, and second end of the spring may be a fixedly mounted end; and first end of the control button may be an operation control end, and second end of the control button may be a movable connecting end for pawl.

In some embodiments, the elastic part may include an elastic member and a pinion connecting rod, and first end of the pinion connecting rod may be hinged to the position deviated from the center of the pinion, and second end of the pinion connecting rod is connected to the elastic member.

In some embodiments, the lower end of the lower arm unit may be provided with an elasticity pre-tensioning adjusting assembly for pre-tensioning and adjusting elasticity, and the elastic member may be connected between the elasticity pre-tensioning adjusting assembly and the pinion connecting rod.

In some embodiments, the energy-storage ratchet wheel may be annular, and the spindle may be located at a center of the energy-storage ratchet wheel.

In some embodiments, the anti-gravity mechanism, the coil spring mechanism and the lower-arm-unit self-locking mechanism may be sequentially stacked, and the coil spring mechanism may be sandwiched between the anti-gravity mechanism and the lower-arm-unit self-locking mechanism.

In some embodiments, the passive energy-storage exoskeleton for assisting elbow joint may include an upper support and a lower support for fixing the upper arm unit and the lower arm unit to an arm of a user respectively, the upper support may be detachably connected with the upper arm unit, and the lower support may be detachably connected with the lower arm unit.

The passive energy-storage exoskeleton for assisting elbow joint provided by the disclosure has the beneficial effects:

1) The exoskeleton according to the embodiment is an all-passive mechanical device without any motor. The exoskeleton increases the lifting capability of the user by utilizing the power of the human body and advantages of mechanism.

2) The anti-gravity mechanism according to the embodiment is compact in structure and configured for equilibrating the weight of the arm of the human body and the weight of the device. The equilibrium may be adjusted by nuts, bolts, etc. to adapt to different weights of the forearms of various users.

3) When raised to support a load, the elbow joint assisted exoskeleton according to the embodiment can be self-locked at any desired position of rotation. The lock may be released by manually activating a corresponding switch or moving the arm to a terminated position.

4) The elbow joint assisted exoskeleton according to the embodiment the present embodiment stores torque generated by swing of the arm of the user to support the lifting operation. In this way, the device can increase the lifting capability of the user.

5) The elbow joint assisted exoskeleton according to the embodiment is light in weight, compact in structure and convenient to wear. It is a cost-effective and efficient assisted device, which not only allows people to operate and carry a load, but also reduces or eliminates muscle fatigue and injuries of the arm of the user.

BRIEF DESCRIPTION OF THE DRAWINGS

In order to more clearly illustrate the technical solution of the present disclosure, the drawings required in the description of the embodiments will be briefly described below. It should be understood that the drawings in the following description are some embodiments of the disclosure and that other drawings may be devised by those skilled in the art according to the drawings without inventive labors.

Figure 1:
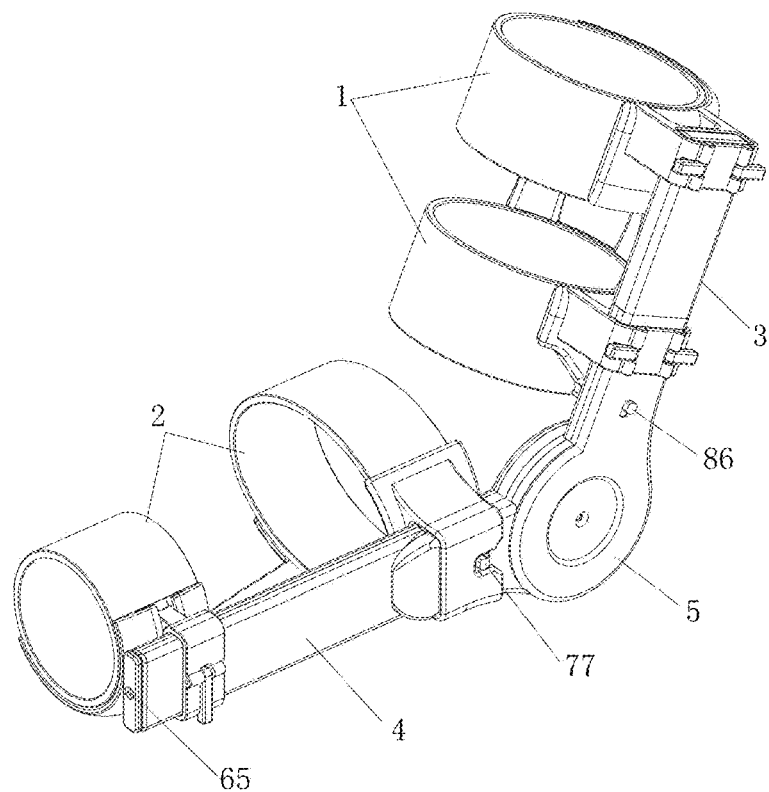
FIG. 1 is a schematic diagram showing a structure of a passive energy-storage exoskeleton for assisting elbow joint according to an embodiment of the present disclosure.

REFERENCE NUMERALS 1 upper support, 2 lower support, 3 upper arm unit, 4 lower arm unit, 5 elbow joint unit,
6 anti-gravity mechanism, 60 cardan's gear mechanism, 61 large ring gear, 62 pinion, 63 elastic member, 64 pinion connecting rod, 65 elasticity pre-tensioning adjusting assembly, 66 nut, 67 screw, 68 moment arm,
7 coil spring mechanism, 71 energy-storage ratchet wheel, 72 spindle, 73 coil spring, 74 pawl B, 75 pawl C, 76 switch B, 77 switch C,
8 lower-arm-unit self-locking mechanism, 81 self-locking ratchet wheel, 82 ratchet teeth portion, 83 protruding edge portion A, 84 protruding edge portion B, 85 pawl A; 86 switch A,
9 control button, 10 spring.

DETAILED DESCRIPTION OF THE INVENTION

The technical solutions in the embodiments of the present disclosure will now be clearly and completely described hereinafter combining with the accompanying drawings in the embodiments of the present disclosure. It is apparent that the described embodiments are only a part of, but not all of, the embodiments of the disclosure. All other embodiments which are obtained by those skilled in the art based on the embodiments of the disclosure without inventive labors, shall fall within the protection scope of the disclosure. It is to be understood that the drawings are provided solely for purposes of illustration and description and are not intended to limit the disclosure. The connection relationships shown in the drawings are merely for clarity of description and are not intended to limit the manner of connection.

It should be noted that when an element is referred to as being "connected" to another element, it can be directly connected to the other element or intervening elements may be present. Unless defined otherwise, all technical and scientific terms used herein have the same meaning as commonly understood by those skilled in the art to which this disclosure belongs. The terms used herein in the description of the disclosure is for the purpose of describing particular embodiments only and is not intended to be limiting of the disclosure.

The disclosure will be further described combining with the drawings and specific embodiments.

FIGS. 1-14 show a passive energy-storage exoskeleton for assisting elbow joint provided by the present disclosure, which includes an upper arm unit 3, a lower arm unit 4, and an elbow joint unit 5 located therebetween, the upper arm unit 3 is rotatably connected with the lower arm unit 4.

The elbow joint unit 5 includes an anti-gravity mechanism 6, a coil spring mechanism 7, and a low-arm-unit self-locking mechanism 8.

The anti-gravity mechanism 6 includes a cardan's gear mechanism 60 and an elastic part, the cardan's gear mechanism 60 includes a big ring gear 61 fixed to the lower arm unit 4 and a pinion 62 hinged to the upper arm unit 3, and the pinion 62 is meshed with the big ring gear 61. A first end of the elastic part is hinged to a position deviated from a center of the pinion 62, and a second end of the elastic part is connected to a lower end of the lower arm unit 4.

The coil spring mechanism 7 includes an energy-storage ratchet wheel 71, a spindle 72, a coil spring 73, a pawl B 74, and a pawl C 75. The energy-storage ratchet wheel 71 is fixed to the lower arm unit 4, and the spindle 72 is fixed to the upper arm unit 3. The coil spring 73 is fixed to the spindle 72 at an inner end of the coil spring 73, and is fixed to the energy-storage ratchet wheel 71 at an outer end of the coil spring 73. The pawl B 74 is hinged to the upper arm unit 3, the pawl C 75 is hinged to the lower arm unit 4, and the pawl B 74 and the pawl C 75 are provided with a switch B 76 and a switch C 77 respectively for adjusting respective engagement of the pawl B 74 and the pawl C 75 with the energy-storage ratchet wheel 71.

The lower-arm-unit self-locking mechanism 8 includes a self-locking ratchet wheel 81 and a pawl A 85. The self-locking ratchet wheel 81 is fixed to the lower arm unit 4, the pawl A 85 is hinged to the upper arm unit 3, the self-locking ratchet wheel 81 includes a ratchet teeth portion 82 and a protruding edge portion which are alternately arranged at an outer edge of the self-locking ratchet wheel 81, and the pawl A 85 is provided with a switch A 86 for adjusting engagement between the pawl A 85 and the ratchet teeth portion 82.

The elbow joint assisted exoskeleton can be worn on an arm of a user to increase the lifting capability of the elbow joint, and avoid muscle fatigue and damage of the upper arm. The moment on the elbow joint generated by the weight of the forearm of the user and the weight of the device can be eliminated or partially eliminated, kinetic energy generated when the human lower arm swings relative to the upper arm can be collected, and then the energy is released as required to help the user to lift a load. The lower arm unit 4 of the device can be locked at any given swing position, at which the moment of the load on the elbow joint is completely borne by the device. The lower arm unit 4 can be unlocked by pushing a switch by hand or swinging the front arm unit to a terminated position and the like.

The anti-gravity mechanism 6 is arranged within the lower arm unit 4, so that it is not exposed to the external, thereby being compact in structure and safe to use. The pinion 62 may be hinged to a pin fixed to the upper arm unit 3, and the large ring gear 61 may be twice the diameter of the pinion 62. The elastic part includes an elastic member 63 and a pinion connecting rod 64, and first end of the pinion connecting rod 64 is hinged to the position deviated from the center of the pinion 62, and second end of the pinion connecting rod 64 is connected to the elastic member 63. The pinion connecting rod 64 may be hinged to a pin fixed to the edge of the pinion 62. The lower end of the lower arm unit 4 is provided with an elasticity pre-tensioning adjusting assembly 65, and the elastic member 63 is connected between the elasticity pre-tensioning adjusting assembly 65 and the pinion connecting rod 64. The elastic member 63 may be an elastic member formed by elastic elements such as springs or rubber bands, so as to provide an elastic stretching function. The elasticity pre-tightening adjusting assembly provides a function of adjusting elasticity, and may adopt an adjusting structure in the prior art. In this embodiment, a nut-screw mechanism is adopted, in which the nut 66 is disposed within the lower arm unit 4 and connected with a rubber band or a spring and may make reciprocating translational motions, and the screw 67 extends into the lower arm unit 4 to be connected to the nut 66 by thread. The whole anti-gravity mechanism 6 is completely arranged within the lower arm unit 4, and the pinion connecting rod 64 may make reciprocating linear motions relative to the central axis of the lower arm unit 4 when the forearm of the user swings and rotates.

The energy-storage ratchet wheel 71 of the coil spring mechanism 7 is annular, the spindle 72 is located at the center of the energy-storage ratchet wheel 71, and the outer end of the coil spring 73 is connected to the inner annular surface of the energy-storage ratchet wheel 71.

In the lower-arm-unit self-locking mechanism 8, the width of the ratchet teeth portion 82 is designed according to the swing range of the lower arm unit 4. When the pawl A 85 is mesh with the ratchet teeth portion 82, the lower arm unit 4 is locked in this position. When the lower unit swings to an upper limit position, the pawl A 85 comes into contact with the protruding edge portion A 83, and the pawl A 85 is pushed away; and when the lower arm unit 4 swings to a lower limit position, the other end of the pawl A 85 comes into contact with the protruding edge portion B 84, and the pawl A 85 is pushed back into the engaged state, namely closed. The shape and structure of the self-locking ratchet wheel 81 ensures that when the lower arm unit 4 swings to a position at an upper limit angle, the protruding edge portion pushes away the pawl A 85, and when the lower arm unit 4 swings to the lower limit angle position, the protruding edge portion closes the pawl A 85. The user is allowed to manually switch the state of the pawl A 85 through the switch A 86 at any swing position of the lower arm unit 4. That is, the position of the pawl may be controlled by the switch under any condition.

The switch A 86, the switch B 76 and the switch C 77 are manually controlled or electrically controlled. The switch A 86, the switch B 76 and the switch C 77 are partly or all bistable switches, and the bistable switch includes a slidable control button 9, two sliding blocks arranged at two sides of the control button 9 and sliding toward each other, and two connecting rods hinged between the control button 9 and the two sliding blocks. The two sliding blocks slide in a direction perpendicular to that of the control button 9, an end of one sliding block and an end of the another sliding block which face away from each other are each connected with a spring 10 at first end of the spring, and second end of the spring 10 is a fixedly mounted end. First end of the control button 9 is an operation control end, and second end of the control button is a movable pawl connecting end. The two stable states of the switch are an engaged state and a non-contact state between the pawl and the ratchet teeth. The position of the switch may be controlled manually or by an actuator. Specifically, taking the switch A 86 as an example to illustrate the connection, one of the movable pawl connecting end of the control button 9 and the pawl A 85 is provided with an elongated hole, while the other one is provided with a sliding pin which matches with and extends into the elongated hole, thereby forming a movable connection. The fixedly mounted end of the spring 10 is fixed to the upper arm unit 3, so that the operation control end of the control button 9 is provided with a button which extends out of the upper arm unit 3 during manual control, facilitating the operation of the control switch.

Figure 6:
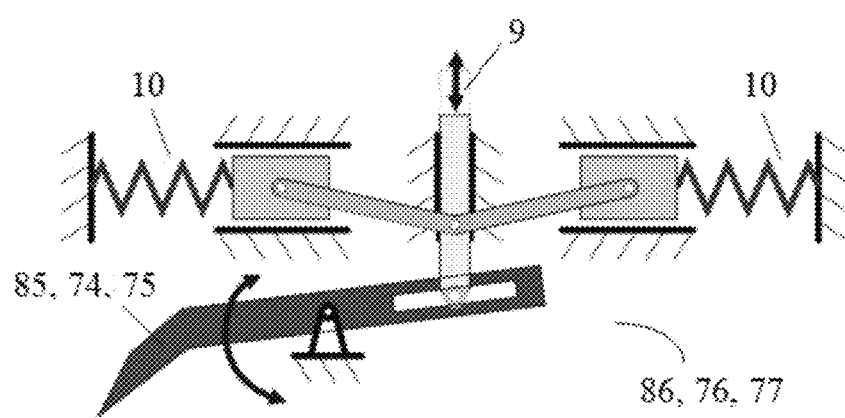
FIG. 6 is a schematic diagram showing a kinematic structure of a bistable switch.

The bistable switch is connected with the pawl by means of the connecting rod, and the kinematic structure is shown in FIG. 6. The engagement or release of the pawl is achieved by controlling the sliding block control button in the figure. When the control button 9 is pressed downwards, the switch pushes the pawl into the release state, and when the button 9 is lifted upwards, the switch pushes the pawl into the engaged state. With the aid of levers, springs 10 and the like, the states of the switches can be switched by just applying a small force to the control button 9. The functional state of the device depends on different combinations of the states of the switches. The user can change the combination of the states of the switches to obtain different functions of the device. The relationships between the states of the switches and the working functions of the device are shown as follows:

| Function | Switch A | Switch B | Switch C |
| --- | --- | --- | --- |
| Store energy by coil spring | On | Off | Off |
| Release energy to assist lift | Off | On | Off |
| Release stored energy | On/Off | On | On |
| Hinder the forearm from rotating downwards | Off | On/Off | On/Off |
| Allow the forearm to rotate downwards | On | On/Off | On/Off |
| Retain energy, allow the forearm to swing freely | On | Off | On |

In this device, the anti-gravity mechanism 6, the coil spring mechanism 7 and the lower-arm-unit self-locking mechanism 8 are sequentially stacked to form the elbow joint unit 5, and the coil spring mechanism 7 is sandwiched between the anti-gravity mechanism 6 and the lower-arm-unit self-locking mechanism 8, thereby forming a compact and efficient sandwich arrangement. The device further includes an upper support 1 and a lower support 2 for fixing the upper arm unit 3 and the lower arm unit 4 to an arm of a user respectively, the upper support 1 is detachably connected with the upper arm unit 3, and the lower support frame is detachably connected with the lower arm unit 4. The forearm of the user may rotate with the lower arm unit 4 about the axis of the elbow joint. The upper support 1 and the lower support 2 can be adjusted according to the shape and size of the arm of the user.

Working Principle:

During lifting and carrying, there are two parameters that affect muscle fatigue and damage of the human hand. One is a duration time of muscle being stressed (or endurance), and the other is a strength of stress borne by muscle. The strength of stress refers to the maximum strength and near maximum strength (over 95%) that a muscle can bear without damage, while the endurance refers to the length of time that a muscle can work with 60% strength of the muscle without fatigue. When a human lifts a weight with 95% of the maximum strength, the endurance is very short, about 0.1 seconds. Therefore, in order to increase the lifting capability of human beings and prevent muscle fatigue and/or damage, an effective way is to design an appropriate locking mechanism to allow the muscles to rest during carrying and to provide an assisted torque to equilibrate (or partially equilibrate) the torque on the muscles generated by the load so as to reduce the muscle burden.

Figure 7:
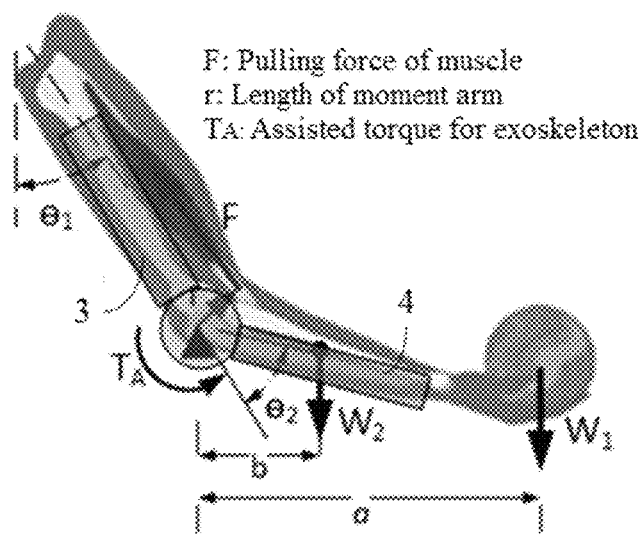
FIG. 7 is a diagram showing a quasi-static biomechanical model of the elbow joint in lifting.
Figure 8:
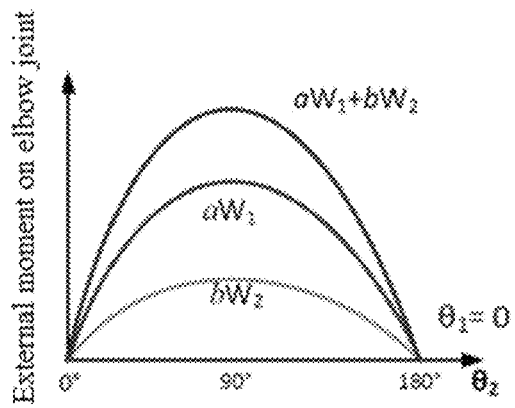
FIG. 8 is a graph showing variations of an external torque with bending angles.

A quasi-static biomechanical model of the elbow joint in lifting is shown in FIG. 7. In the model, W1 is a weight of a load lifted; and W2 is a sum of a weight of the device and a weight of the human forearm. W1 is variable, but W2 is constant. W1 and W2 each generate an external torque acting on the elbow joint during lifting or supporting. This moment is a sinusoidal function of a bending angle θ1 of the elbow joint, as shown in FIG. 8. The assisted torque TA is generated by the device to overcome the external torque. If TA cannot completely equilibrate the external moment generated by W1 and W2, the biceps muscle of the arm needs to contract to generate a pulling force F, and its relationship with TA, W1 and W2 and length of the moment arm r is as follows:

$$F(\theta 1, \theta 2) = \frac{a(\theta 1, \theta 2)W_1 + b(\theta 1, \theta 2)W_2 - T_A(\theta 1, \theta 2)}{r(\theta 1, \theta 2)} \quad (1)$$

Therefore, the problem to be solved becomes how to design a passive wearable assisted arm to ensure that the assisted moment TA compensates the external moment generated by W1 and W2, so as to minimize the maximum pulling force F of the muscle and minimize energy consumption of the muscle. In mathematics, these objects can be expressed as:

$$T_A(\theta_1,\theta_2) \rightarrow [a(\theta_1,\theta_2)W_1 + b(\theta_1,\theta_2)W_2], 0 \le \lambda \le 1 \quad (2)$$

$$\text{Objective} \rightarrow \text{Min}\{\max[F(\theta_1,\theta_2)]\}\text{Min}\{\int_0 Fra\theta_1\} \quad (3)$$

a) To Compensate the Moment Generated by W1

Figure 2:
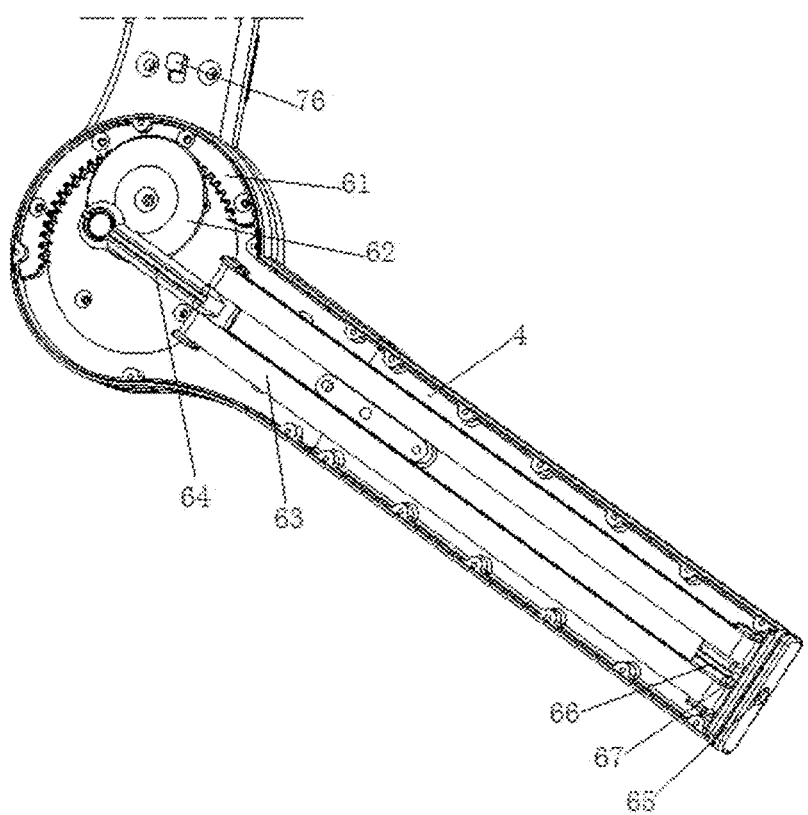
FIG. 2 is a schematic diagram showing a structure of an anti-gravity mechanism of FIG. 1.
Figure 3:
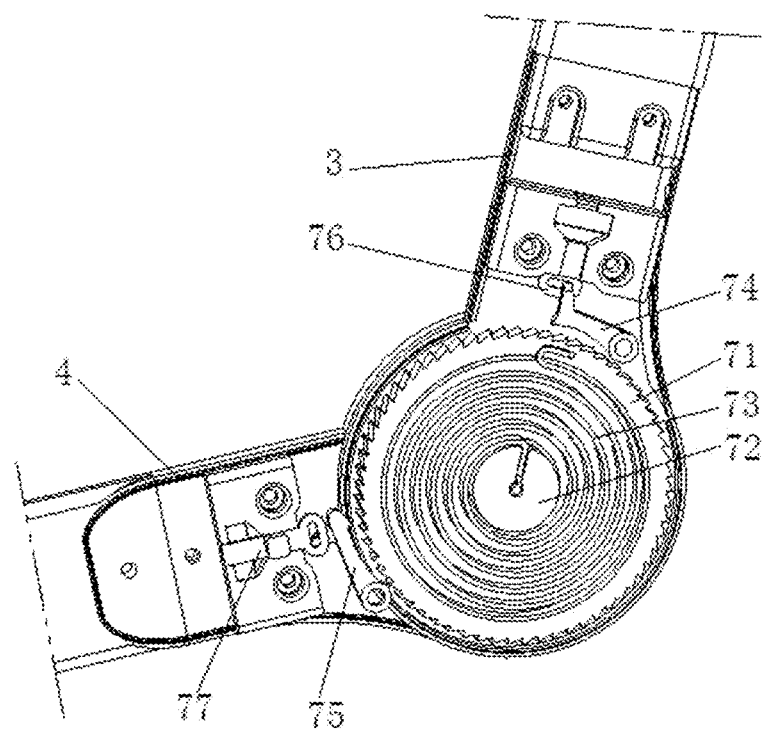
FIG. 3 is a schematic diagram showing a structure of a coil spring mechanism of FIG. 1.
Figure 9:
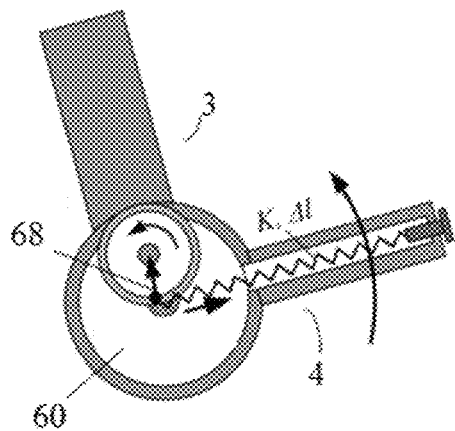
FIG. 9 is a diagram showing the kinematic structure of a cardan's gear mechanism.
Figure 10:
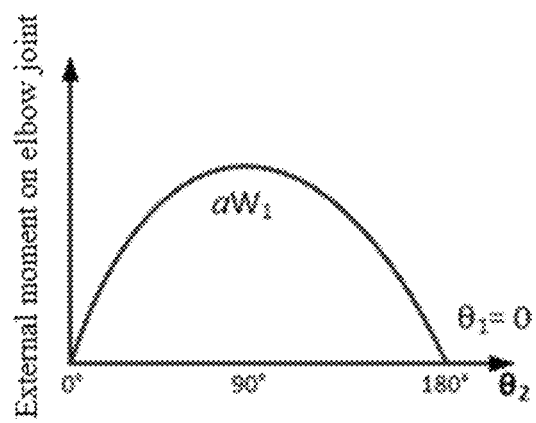
FIG. 10 is a graph showing the external torque when the anti-gravity mechanism is used.

The weight W1 will generate an external torque aW1 on the elbow joint. A spring-loaded cardan's gear mechanism is used to compensate this torque, as shown in FIG. 2. The mechanism converts rotational motion of the pinion 62 into translational motion of the connecting rod 64. The elastic member 63 (the rubber band in FIG. 2) is connected to the connecting rod and the tension adjusting nut. The kinematic structure of the cardan's gear mechanism 60 is shown in FIGS. 9 and 10. Since the center of the pinion 62 is offset from a rotating center of the arm, the elastic force may generate a counterclockwise moment for equilibrating the moment generated by W1. This moment can be expressed mathematically as:

$$TA1 = Fd \sin(\theta 1); \quad (5)$$

$$F = K(2d \cos(\theta 1) + C - L0) \quad (6)$$

where d is a distance of the moment arm 68 of the gear; k is a stiffness of the spring, L0 is a free length of the spring, and C is a distance between the rotating center of the lower arm and the tension adjusting nut. It can be seen that the torque generated by W1 can be compensated, if K, d, C, L0 are selected appropriately. The item L0 can also be adjusted by rotating the adjustable nut.

b) To Compensate the Torque Generated by W2

Figure 11:
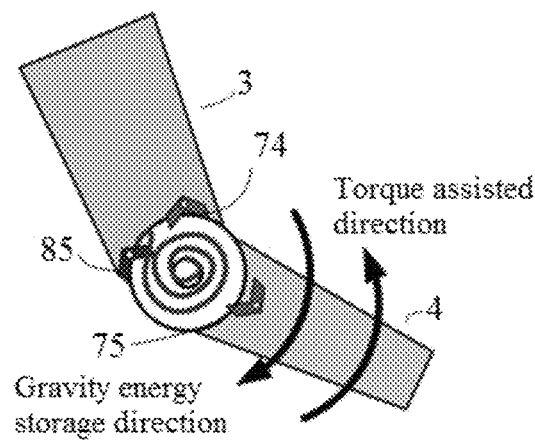
FIGS. 11 and 12 are schematic diagrams showing a motion structure of the coil spring mechanism.
Figure 12:
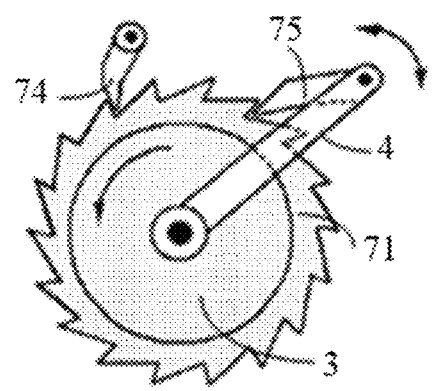
Figure 13:
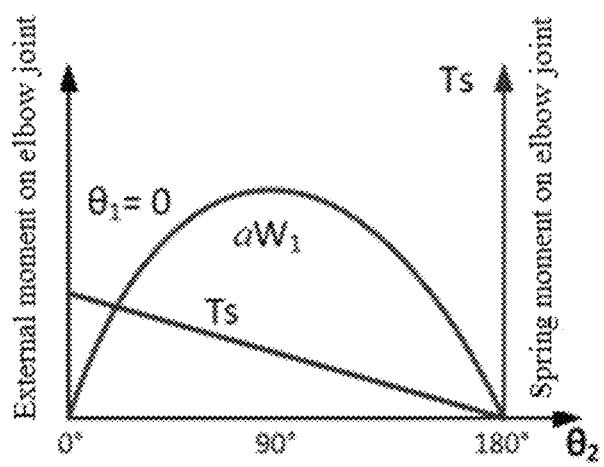
FIGS. 13 and 14 are graphs showing a coil spring torque which compensates the external torque.
Figure 14:
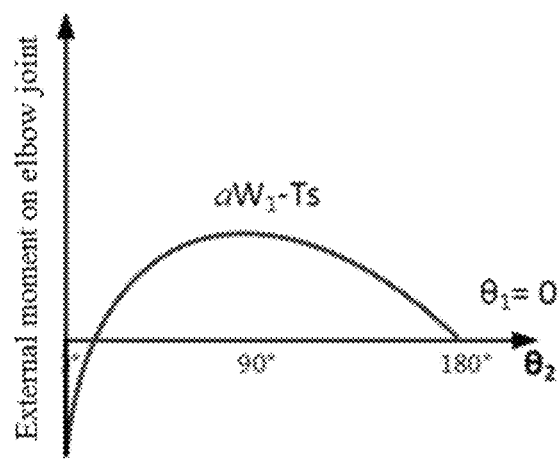

Similarly, the weight W2 will generate a torque bW2 on the elbow joint. An effect of the torque can be minimized by employing the coil spring mechanism 7. The rotation of the energy-storage ratchet wheel 71 is controlled by the three switches, i.e. switches A 86, B 76 and C 77, as shown in FIGS. 11 and 12. When the switch A 86 is opened, and the switches B 76 and C 77 drive the pawls B 74 and C 75 to be meshed with the ratchet teeth, the coil spring 73 can capture the kinetic energy generated by the swing of the human arm. After the coil spring 73 has stored energy, the coil spring 73 stores a torque Ts in the system. The value of the torque depends on the number of times the human arm swings. When the switch B 76 is opened and the switch C 77 is still in the engaged state, the coil spring 73 applies a torque to the lower arm. When both the switches B 76 and C 77 are opened, the torque will disappear. If the coil spring 73 is compressed by 180 degrees, the torque Ts is 180 Ks, where Ks is the torsional stiffness of the coil spring 73. FIG. 13 shows a schematic diagram illustrating how Ts compensates the torque bW2. It can be seen that Ts, although not completely eliminating the torque, can greatly reduce the maximum value of bW2.

c) To Lock/Release the Ratchet Wheel Mechanism

Figure 4:
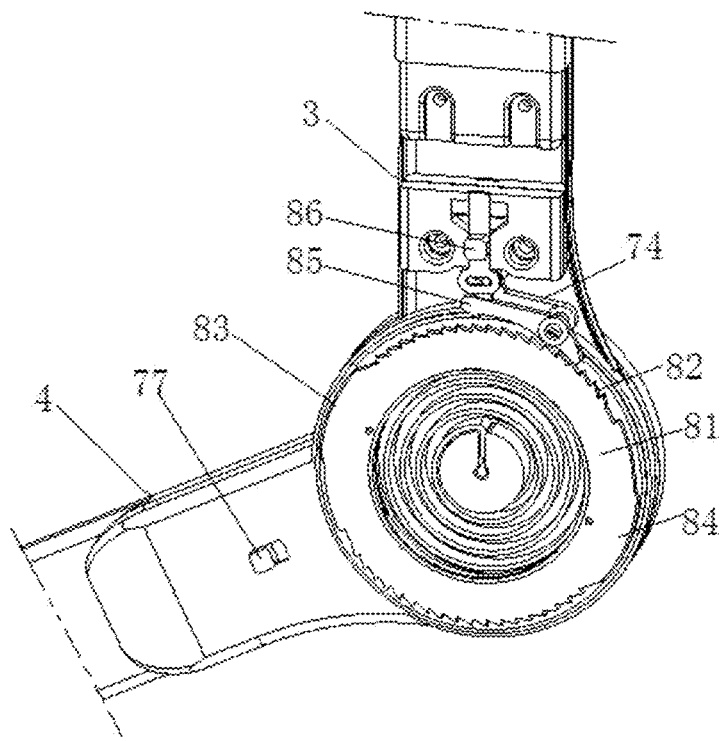
FIG. 4 is a schematic diagram showing a structure of a lower-arm-unit self-locking mechanism of FIG. 1.
Figure 5:
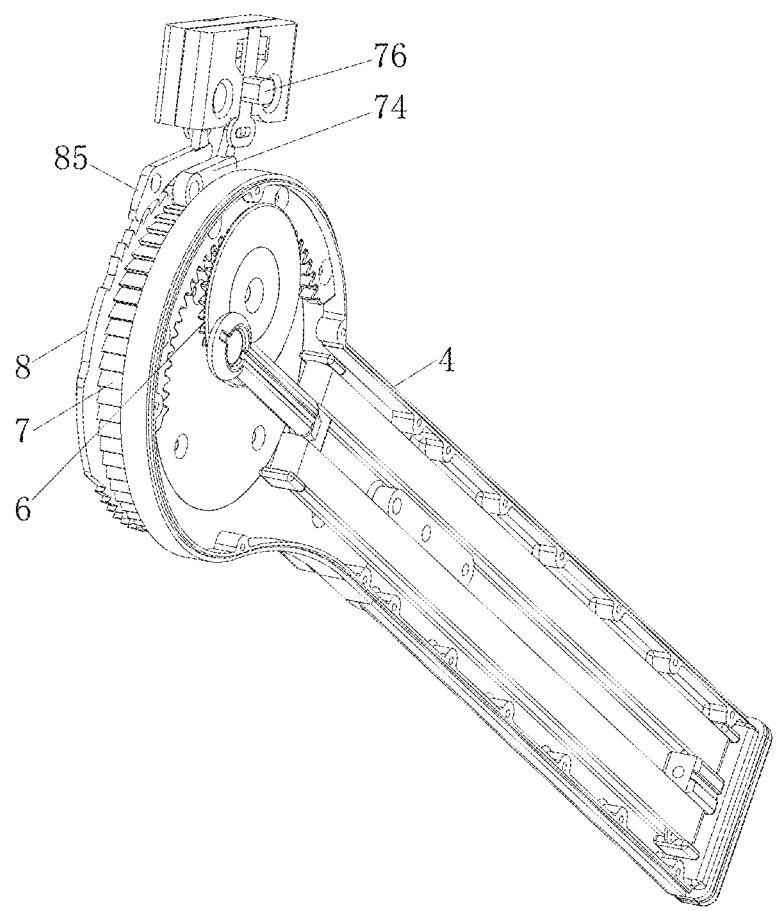
FIG. 5 is a schematic diagram showing a structure of an elbow joint unit of FIG. 1.

In the ratchet wheel mechanism, the pawl allows the ratchet wheel to rotate in one direction but hinders its movement in the opposite direction. Referring to FIG. 4, the self-locking ratchet wheel 81 is designed into a special shape, and multiple ratchet teeth are formed in a specific portion (a working range of the forearm, a range of about 135 degrees), and two protruding edge portions are formed at two ends of the ratchet teeth, respectively. The pawl A 85 is a lever connected to a bistable switch (switch A 86), and if the pawl is engaged with the ratchet teeth, the lower arm unit 4 is only allowed to move upwards, while the downward movement is hindered. However, when the lower arm unit 4 rotates to the limit position, the protruding edge pushes the pawl upwards. In this case, the engagement is released, and the arm may move downwards, and vice versa. Referring to FIGS. 11 and 12, the motion of the energy-storage ratchet wheel 71 is controlled by the two pawls (B and C).

The present disclosure is not limited to the above-described alternative embodiments, and any person can obtain other products in various forms under the inspiration of the present disclosure. No matter any change made in the shape or structure of present disclosure, all technical solutions falling within the scope of the present invention defined in the claims fall within the protection scope of the present invention.

What is claimed is:

1. A passive energy-storage exoskeleton for assisting elbow joint, comprising an upper arm unit, a lower arm unit, and an elbow joint unit located therebetween, the upper arm unit being rotatably connected with the lower arm unit; wherein the elbow joint unit comprises an anti-gravity mechanism, a coil spring mechanism, and a lower-arm-unit self-locking mechanism;

the anti-gravity mechanism comprises a cardan's gear mechanism and an elastic part, the cardan's gear mechanism comprises a big ring gear fixed to the lower arm unit and a pinion hinged to the upper arm unit, and the pinion is meshed with the big ring gear; a first end of the elastic part is hinged to a position deviated from a center of the pinion, and a second end of the elastic part is connected to a lower end of the lower arm unit;

the coil spring mechanism comprises an energy-storage ratchet wheel, a spindle, a coil spring, a pawl B, and a pawl C; the energy-storage ratchet wheel is fixed to the lower arm unit, and the spindle is fixed to the upper arm unit; the coil spring is fixed to the spindle at an inner end of the coil spring, and is fixed to the energy-storage ratchet wheel at an outer end thereof; the pawl B is hinged to the upper arm unit, the pawl C is hinged to the lower arm unit, and the pawl B and the pawl C are provided with a switch B and a switch C respectively for adjusting respective engagements of the pawl B and the pawl C with the energy-storage ratchet wheel; and the lower-arm-unit self-locking mechanism comprises a self-locking ratchet wheel and a pawl A, the self-locking ratchet wheel is fixed to the lower arm unit, the pawl A is hinged to the upper arm unit, the self-locking ratchet wheel comprises a ratchet teeth portion and a protruding edge portion which are alternately arranged at an outer edge of the self-locking ratchet wheel, and the pawl A is provided with a switch A for adjusting engagement between the pawl A and the ratchet teeth portion.

2. The passive energy-storage exoskeleton for assisting elbow joint of claim 1, wherein the anti-gravity mechanism is arranged within the lower arm unit.

3. The passive energy-storage exoskeleton for assisting elbow joint of claim 1, wherein the switch A, the switch B and the switch C are manually controlled or electrically controlled.

4. The passive energy-storage exoskeleton for assisting elbow joint of claim 3, wherein at least one of the switch A, the switch B and the switch C is bistable switch, and the bistable switch comprises a slidable control button, two sliding blocks arranged at two sides of the control button and sliding toward each other, and two connecting rods hinged between the control button and the two sliding blocks; the two sliding blocks slide in a direction perpendicular to that of the control button; an end of one of the two sliding blocks and an end of another sliding block facing away from the end of the one are each connected with a spring at a first end of the spring, and a second end of the spring is a fixedly mounted end; and a first end of the control button is an operation control end, and a second end of the control button is a movable pawl connecting end.

5. The passive energy-storage exoskeleton for assisting elbow joint of claim 1, wherein at least one of the switch A, the switch B and the switch C is bistable switch, and the bistable switch comprises a slidable control button, two sliding blocks arranged at two sides of the control button and sliding toward each other, and two connecting rods hinged between the control button and the two sliding blocks; the two sliding blocks slide in a direction perpendicular to that of the control button; an end of one of the two sliding blocks and an end of another sliding block facing away from the end of the one are each connected with a spring at a first end of the spring, and a second end of the spring is a fixedly mounted end; and a first end of the control button is an operation control end, and a second end of the control button is a movable pawl connecting end.

6. The passive energy-storage exoskeleton for assisting elbow joint of claim 1, wherein the elastic part comprises an elastic member and a pinion connecting rod, and a first end of the pinion connecting rod is hinged to the position deviated from the center of the pinion, and a second end of the pinion connecting rod is connected to the elastic member.

7. The passive energy-storage exoskeleton for assisting elbow joint of claim 6, wherein the lower end of the lower arm unit is provided with an elasticity pre-tensioning adjusting assembly, and the elastic member is connected between the elasticity pre-tensioning adjusting assembly and the pinion connecting rod.

8. The passive energy-storage exoskeleton for assisting elbow joint of claim 1, wherein the energy-storage ratchet wheel is annular, and the spindle is located at a center of the energy-storage ratchet wheel.

9. The passive energy-storage exoskeleton for assisting elbow joint of claim 1, wherein the anti-gravity mechanism, the coil spring mechanism and the lower-arm-unit self-locking mechanism are sequentially stacked, and the coil spring mechanism is sandwiched between the anti-gravity mechanism and the lower-arm-unit self-locking mechanism.

10. The passive energy-storage exoskeleton for assisting elbow joint of claim 1, further comprising an upper support and a lower support for fixing the upper arm unit and the lower arm unit to an arm of a user respectively, the upper support being detachably connected with the upper arm unit, and the lower support being detachably connected with the lower arm unit.

* * * * *